US012588005B2

(12) United States Patent
Li et al.

(10) Patent No.: US 12,588,005 B2
(45) Date of Patent: Mar. 24, 2026

(54) MANAGEMENT METHOD AND SYSTEM FOR SHARED RADIO UNIT

(71) Applicant: Nanning FuLian FuGui Precision Industrial Co., Ltd., Nanning (CN)

(72) Inventors: Dong-Ming Li, Shanghai (CN);
Yan-Hua Peng, Shenzhen (CN);
Yun-Feng Peng, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 316 days.

(21) Appl. No.: 18/243,240

(22) Filed: Sep. 7, 2023

(65) Prior Publication Data

US 2024/0147431 A1      May 2, 2024

(30) Foreign Application Priority Data

Oct. 31, 2022    (CN) .......................... 202211347067.3

(51) Int. Cl.
| | |
|---|---|
| *H04W 72/04* | (2023.01) |
| *G06F 16/335* | (2019.01) |
| *H04L 9/40* | (2022.01) |
| *H04L 67/133* | (2022.01) |

(52) U.S. Cl.
CPC .......... *H04W 72/04* (2013.01); *G06F 16/337* (2019.01); *H04L 63/083* (2013.01); *H04L 63/104* (2013.01); *H04L 67/133* (2022.05)

(58) Field of Classification Search
CPC ..... H04W 72/04; H04W 28/26; H04W 12/08; H04W 16/02; H04W 28/16; G06F 16/337; H04L 63/083; H04L 63/104; H04L 67/133
See application file for complete search history.

(56) References Cited

U.S. PATENT DOCUMENTS

| | | | |
|---|---|---|---|
| 2016/0323768 A1 | 11/2016 | Xu et al. | |
| 2021/0203646 A1* | 7/2021 | Lengyel | ................ H04L 63/101 |
| 2022/0132320 A1 | 4/2022 | Bye et al. | |
| 2022/0286307 A1 | 9/2022 | Thompson et al. | |
| 2022/0405144 A1* | 12/2022 | Sun | .......................... G06F 9/468 |

FOREIGN PATENT DOCUMENTS

| | | |
|---|---|---|
| CN | 102340875 A | 2/2012 |
| CN | 107710157 B | 12/2020 |
| TW | 202126079 A | 7/2021 |

* cited by examiner

*Primary Examiner* — Shawn D Miller
(74) *Attorney, Agent, or Firm* — ScienBiziP, P.C.

(57) ABSTRACT

In a management method and system for a shared radio unit and a computer-readable storage medium, N user groups are created for N operators, where N is a positive integer greater than 1; resources of the shared radio unit are divided into public resources and N private resources; the N user groups and the N private resources are bound correspondingly, and the N user groups are set to only have access to corresponding private resources bound in the N private resources; resource permissions of the shared radio unit are initialized, and account passwords configured for the N user groups are sent to the corresponding N operators respectively; and the N operators configures parameters to a data model language database according to the account passwords.

6 Claims, 2 Drawing Sheets

MANAGEMENT METHOD AND SYSTEM FOR SHARED RADIO UNIT

CROSS-REFERENCE TO RELATED APPLICATIONS

This application claims priority to Chinese Patent Application No. 202211347067.3 filed on Oct. 31, 2022, in China State Intellectual Property Administration, the contents of which are incorporated by reference herein.

FIELD

The subject matter herein generally relates to shared radio unit technology, in particular to a management method and system for a shared radio unit.

BACKGROUND

According to the existing Open Radio Access Network (O-RAN) standard, different users can modify the data of a same data model (for example, YANG model). Therefore, different operators can configure Shared Radio Unit (Shared RU) through the same data model (for example, YANG model), and the private data isolation requirements between different operators cannot be met. In addition, different users can modify the data of the same data model (for example, YANG model), and there will be a risk of different operators modifying each other's configuration, which is not suitable for the use scenario of Shared RU.

BRIEF DESCRIPTION OF THE DRAWINGS

Implementations of the present technology will now be described, by way of example only, with reference to the attached figures, wherein.

DETAILED DESCRIPTION

Figure 1:
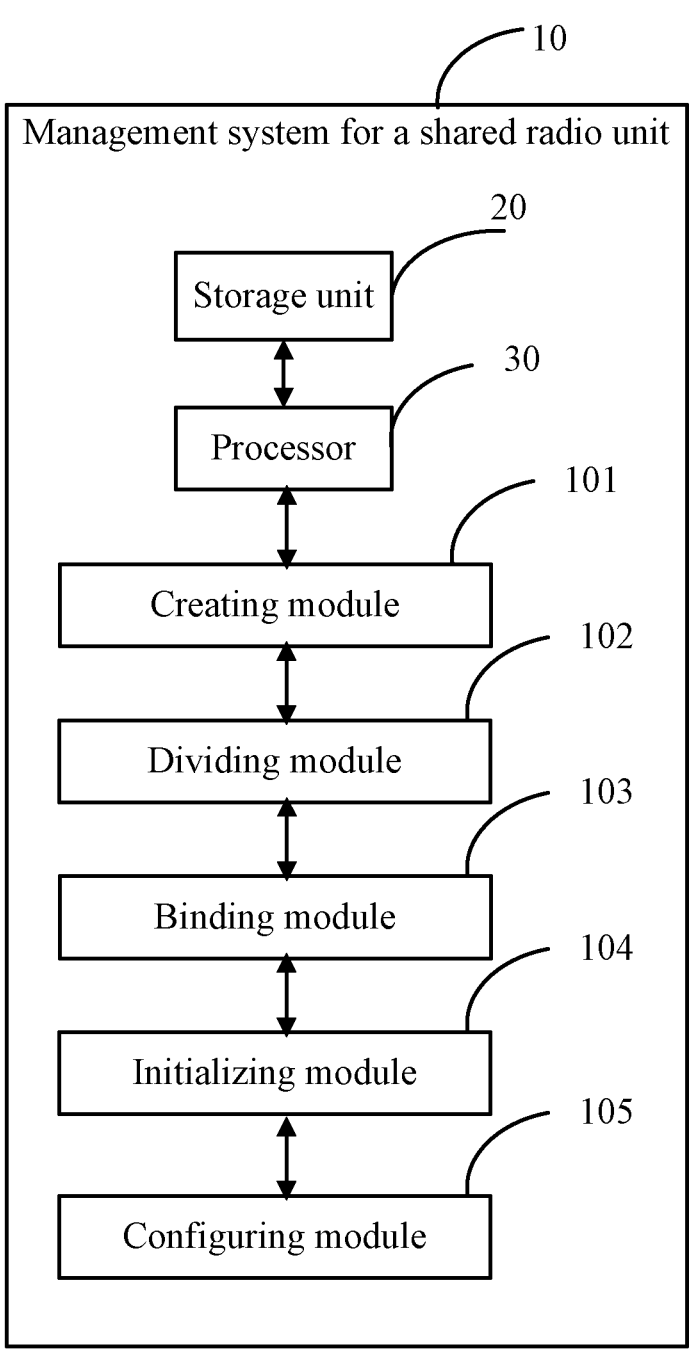
FIG. 1 is a block diagram of an embodiment of a management system for a shared radio unit according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an exemplary embodiment of functional modules of a management system for a shared radio unit 10.

The management system for a shared radio unit 10 includes a creating module 101, a dividing module 102, a binding module 103, an initializing module 104, and a configuring module 105. The management system 10 further includes a storage unit 20, and a processor 30. The modules are configured to be executed by one or more processors (in the embodiment, one processor 30). The modules referred to are computer program segments that perform specific instructions. The storage unit 20 is used to store program code and other data of the management system for a shared radio unit 10. The processor 30 is used to execute the program code stored in the storage unit 20.

The storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and other components. The processor 30 may be a central processing unit (CPU), a controller, a microcontroller, a microprocessor, or other data processing chip.

The creating module 101 is configured to create N user groups for N operators respectively.

For example, 4 user groups are created for 4 operators (operator a, operator b, operator c, and operator d), namely user group A, user group B, user group C, and user group D. In the embodiment, N is a positive integer greater than 1, and is not limited to 4 in the embodiment, and developers can set N to other numbers according to actual needs. An operator refers to a mobile network operator (MNO), which refers to a supplier that provides network services, such as China Mobile, China Unicom, China Telecom, and China Radio and Television.

The dividing module 102 is configured to divide resources of the shared radio unit into public resources and N private resources.

A shared radio unit (Shared RU) refers to a radio unit (RU) device that can be shared with different operators for common use. The radio unit device has 4 RU modules, and each of the modules can be leased to different operators. A distributed unit (DU) of the operator configures the central frequency and bandwidth through the management plane (M-Plane) of the open radio access network (O-RAN). For example, the dividing module 102 divides the resources of the Shared RU into public resources and 4 private resources.

The binding module 103 is configured to bind the N user groups and the N private resources correspondingly, and set the N user groups to only have access to corresponding private resources bound in the N private resources.

For example, the binding module 103 binds the 4 private resources of Shared RU to 4 user groups respectively, and binds the 4 private resources as the private resources of user group A, the private resources of user group B, the private resources of user group C, and the private resources of user group D. In this way, user group A can only read/write/execute the private resources of user group A, user group B can only read/write/execute the private resources of user group B, and user group C can only read/write/execute the private resources of user group C, and user group D can only read/write/execute the private resources of user group D.

The initializing module 104 is configured to initialize resource permissions of the shared radio unit, and send account passwords configured for the N user groups to the corresponding N operators respectively.

Specifically, the initializing module 104 initializes the resource permissions of the shared radio unit in the following manner:

creating the N user groups in ietf-netconf-acm; creating permissions of o-ran-uplane-conf in the ietf-netconf-acm, the permissions comprise reading, writing and executing; binding relationship between the N user groups and the resource permissions in the ietf-netconf-acm; defining a name of each resource of the o-ran-uplane-conf; creating a resources.json file to save the relationship between the N user groups and the resource permissions of each resource; creating N users, and adding the N users to the N different user groups respectively; and handing over the account passwords configured for the N user groups to the N operators.

In the embodiment, the operator configures parameters such as center frequency and bandwidth by means of the carrier of o-ran-uplane-conf.

For example, operator a, operator b, operator c, and operator d respectively define carriers as carrier1, carrier2, carrier3, and carrier4, which correspond to the 4 private resources of the Shared RU. For example, operator a defines the carrier as carrier1, and binds the private resources of user group A in the Shared RU; operator b defines the carrier as carrier2, and binds the private resources of user group B in the Shared RU; operator c defines the carrier as carrier3, and binds the private resources of user group C in the Shared RU; and operator d defines the carrier as carrier4, and binds the private resources of user group D in the Shared RU.

For example, if having permission to edit the parameters corresponding to carrier1, operator a can configure parameters such as center frequency and bandwidth to the YANG database.

The configuring module 105 is configured to assist the N operators to configure parameters to a data model language database according to the account passwords.

In the embodiment, the data model language database is a YANG database.

The configuring module 105 assists the N operators to configure parameters to a data model language database according to the account passwords in the following manner:

the N operators use the account passwords to establish a NETCONF connection with a radio unit device; the N operators invoke an edit-config command of NETCONF to modify parameters of frequency point and bandwidth; the radio unit device receives a remote procedure call (RPC) request of NETCONF to trigger detection of application configuration management (ACM) permission, and determines whether the operators have permission to edit parameters of the o-ran-uplane-conf; when the operators have the permission to edit the parameters of the o-ran-uplane-conf, the configuring module 105 triggers resource permission detection, and determines whether the operators have the permission to edit the parameters corresponding to an carrier name; and if the operators have the permission to edit the parameters corresponding to a carrier name, the configuring module 105 configures parameters to the YANG database.

In the embodiment, by means of dividing the resources of the shared radio unit into public resources and multiple private resources, and binding multiple user groups of multiple operators with multiple private resources of the shared radio unit, the permission control of resource granularity can be increased, so that operators will not affect each other's data and avoid tampering with each other.

Figure 2:
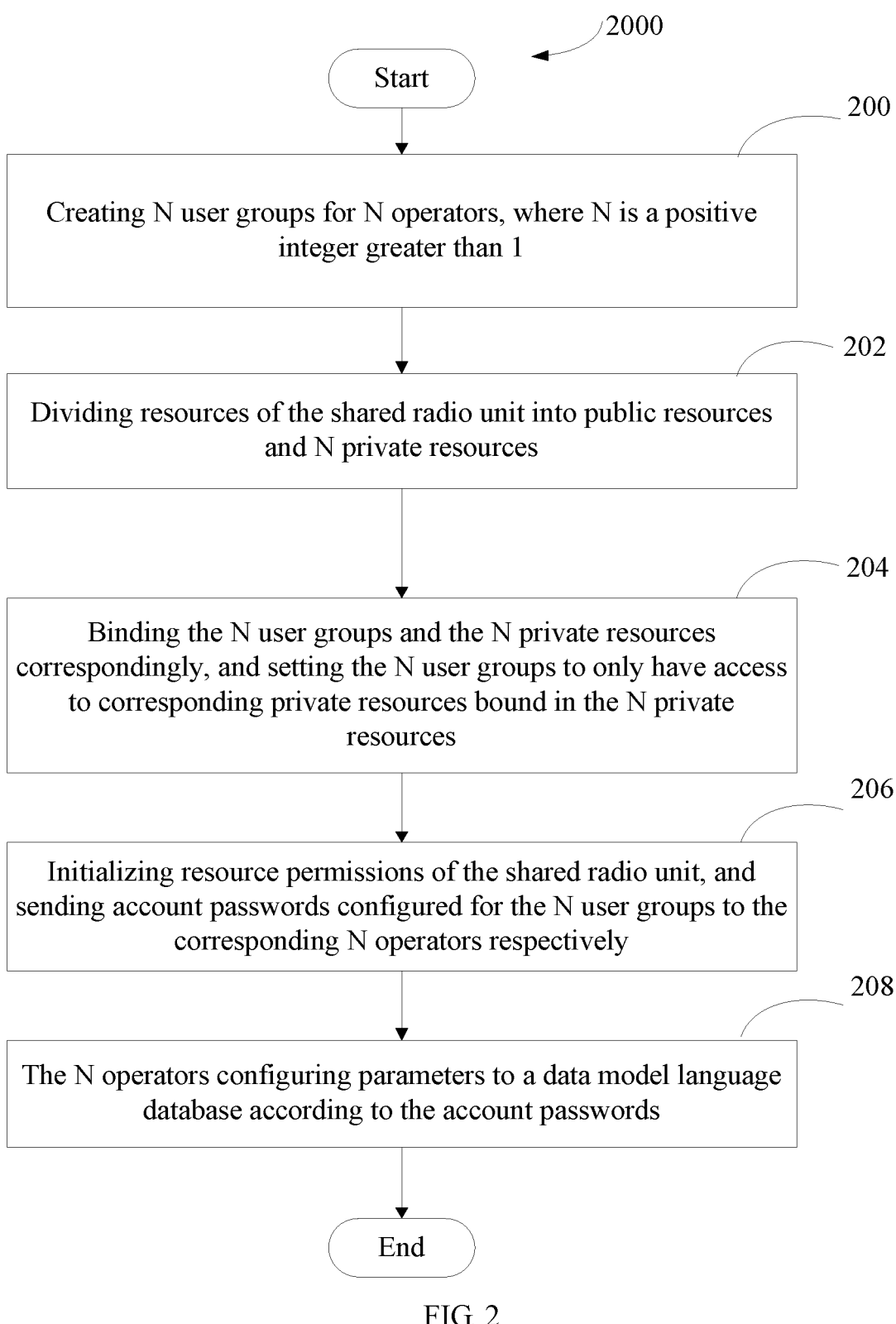
FIG. 2 is a flowchart of a management method for a shared radio unit according to an embodiment of the present disclosure.

FIG. 2 illustrates a flowchart presented in accordance with an embodiment of a management method for a shared radio unit 2000. Each block shown in FIG. 2 represents one or more processes, methods, or subroutines, carried out in the exemplary method 2000. Additionally, the illustrated order of blocks is by example only and the order of the blocks can be changed. The method 2000 can begin at block 200.

At block 200, creating N user groups for N operators respectively.

For example, 4 user groups are created for 4 operators (operator a, operator b, operator c, and operator d), namely user group A, user group B, user group C, and user group D. In the embodiment, N is a positive integer greater than 1, and is not limited to 4 in the embodiment, and developers can set N to other numbers according to actual needs. An operator refers to a mobile network operator (MNO), which refers to a supplier that provides network services, such as China Mobile, China Unicom, China Telecom, and China Radio and Television.

At block 202, dividing resources of the shared radio unit into public resources and N private resources.

A shared radio unit (Shared RU) refers to a radio unit (RU) device that can be shared with different operators for common use. The radio unit device has 4 RU modules, and each of the modules can be leased to different operators. A distributed unit (DU) of the operator configures the central frequency and bandwidth through the management plane (M-Plane) of the open radio access network (O-RAN). For example, the dividing module 102 divides the resources of the Shared RU into public resources and 4 private resources.

At block 204, binding the N user groups and the N private resources correspondingly, and set the N user groups to only have access to corresponding private resources bound in the N private resources.

For example, the 4 private resources of Shared RU are bound to 4 user groups respectively, and the 4 private resources are bound as the private resources of user group A, the private resources of user group B, the private resources of user group C, and the private resources of user group D. In this way, user group A can only read/write/execute the private resources of user group A, user group B can only read/write/execute the private resources of user group B, and user group C can only read/write/execute the private resources of user group C, and user group D can only read/write/execute the private resources of user group D.

At block 206, initializing resource permissions of the shared radio unit, and sending account passwords configured for the N user groups to the corresponding N operators respectively.

Specifically, initializing the resource permissions of the shared radio unit, includes:

creating the N user groups in ietf-netconf-acm; creating permissions of o-ran-uplane-conf in the ietf-netconf-acm, the permissions include reading, writing and executing; binding relationship between the N user groups and the resource permissions in the ietf-netconf-acm; defining a name of each resource of the o-ran-uplane-conf; creating a resources.json file to save the relationship between the N user groups and the resource permissions of each resource; creating N users, and adding the N users to the N different user groups respectively; and handing over the account passwords configured for the N user groups to the N operators.

In the embodiment, the operator configures parameters such as center frequency and bandwidth by means of the carrier of o-ran-uplane-conf. For example, operator a, operator b, operator c, and operator d respectively define carriers as carrier1, carrier2, carrier3, and carrier4, which correspond to the 4 private resources of the Shared RU. For example, operator a defines the carrier as carrier1, and binds the private resources of user group A in the Shared RU; operator b defines the carrier as carrier2, and binds the private resources of user group B in the Shared RU; operator c defines the carrier as carrier3, and binds the private resources of user group C in the Shared RU; and operator d defines the carrier as carrier4, and binds the private resources of user group D in the Shared RU.

For example, if configured with permission to edit the parameters corresponding to carrier1, operator a can configure parameters such as center frequency and bandwidth to the YANG database.

At block 208, the N operators configuring parameters to a data model language database according to the account passwords.

In the embodiment, the data model language database is a YANG database.

The N operators configuring parameters to a data model language database according to the account passwords, includes:

The N operators using the account passwords to establish a NETCONF connection with a radio unit device; the N operators invoking an edit-config command of NETCONF to modify parameters of frequency point and bandwidth; the radio unit device receives a remote procedure call (RPC) request of NETCONF to trigger detection of application configuration management (ACM) permission, and determining whether the operators have permission to edit parameters of the o-ran-uplane-conf; when the operators have the permission to edit the parameters of the o-ran-uplane-conf, triggering resource permission detection, and determining whether the operators have the permission to edit the parameters corresponding to an carrier name; and if the operators have the permission to edit the parameters corresponding to a carrier name, configuring parameters to the YANG database.

In the embodiment, by means of dividing the resources of the shared radio unit into public resources and multiple private resources, and binding multiple user groups of multiple operators with multiple private resources of the shared radio unit, the permission control of resource granularity can be increased, so that operators will not affect each other's data and avoid tampering with each other.

The embodiments shown and described above are only examples. Many details are often found in the art such as the other features of method for video compression by data processing. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A management method for a shared radio unit, the method comprising:

creating N user groups for N operators, where N is a positive integer greater than 1;

dividing resources of the shared radio unit into public resources and N private resources;

binding the N user groups and the N private resources correspondingly, and setting the N user groups to only have access to corresponding private resources bound in the N private resources;

initializing resource permissions of the shared radio unit, and sending account passwords configured for the N user groups to the corresponding N operators respectively; and the N operators configuring parameters to a data model language database according to the account passwords;

wherein the data model language database is a YANG database, and the initializing resource permissions of the shared radio unit comprises:

creating the N user groups in ietf-netconf-acm;

creating permissions of o-ran-uplane-conf in the ietf-netconf-acm, the permissions comprise reading, writing and executing;

binding relationship between the N user groups and the resource permissions in the ietf-netconf-acm;

defining a name of each resource of the o-ran-uplane-conf;

creating a resources.json file to save the relationship between the N user groups and the resource permissions of each resource;

creating N users, and adding the N users to the N different user groups respectively; and handing over the account passwords configured for the N user groups to the N operators.

2. The management method for a shared radio unit according to claim 1, wherein the N operators configuring parameters to a data model language database according to the account passwords comprises:

the N operators using the account passwords to establish a NETCONF connection with a radio unit device;

the N operators invoking an edit-config command of NETCONF to modify parameters of frequency point and bandwidth;

the radio unit device receiving a remote procedure call request of NETCONF to trigger detection of application configuration management permission, and determining whether the operators have permission to edit parameters of the o-ran-uplane-conf;

when the operators have the permission to edit the parameters of the o-ran-uplane-conf, triggering resource permission detection, and determining whether the operators have the permission to edit the parameters corresponding to a carrier name; and if the operators have the permission to edit the parameters corresponding to a carrier name, configuring parameters to the YANG database.

3. A management system for a shared radio unit, the management system comprising:

at least one processor;

a storage unit; and one or more programs that are stored in the storage unit and executed by the at least one processor, the one or more programs comprising instructions for:

creating N user groups for N operators, where N is a positive integer greater than 1;

dividing resources of the shared radio unit into public resources and N private resources;

binding the N user groups and the N private resources correspondingly, and setting the N user groups to only have access to corresponding private resources bound in the N private resources;

initializing resource permissions of the shared radio unit, and sending account passwords configured for the N user groups to the corresponding N operators respectively; and the N operators configuring parameters to a data model language database according to the account passwords;

wherein the data model language database is a YANG database, and the initializing resource permissions of the shared radio unit comprises:

creating the N user groups in ietf-netconf-acm;

creating permissions of o-ran-uplane-conf in the ietf-netconf-acm, the permissions comprise reading, writing and executing;

binding relationship between the N user groups and the resource permissions in the ietf-netconf-acm;

defining a name of each resource of the o-ran-uplane-conf;

creating a resources.json file to save the relationship between the N user groups and the resource permissions of each resource;

creating N users, and adding the N users to the N different user groups respectively; and handing over the account passwords configured for the N user groups to the N operators.

4. The management method for a shared radio unit according to claim 3, wherein the N operators configuring parameters to a data model language database according to the account passwords comprises:

the N operators using the account passwords to establish a NETCONF connection with a radio unit device;

the N operators invoking an edit-config command of NETCONF to modify parameters of frequency point and bandwidth;

the radio unit device receiving a remote procedure call request of NETCONF to trigger detection of application configuration management permission, and determining whether the operators have permission to edit parameters of the o-ran-uplane-conf;

when the operators have the permission to edit the parameters of the o-ran-uplane-conf, triggering resource permission detection, and determining whether the operators have the permission to edit the parameters corresponding to a carrier name; and if the operators have the permission to edit the parameters corresponding to a carrier name, configuring parameters to the YANG database.

5. A non-transitory computer-readable storage medium in which computer programs are stored, and the computer programs can be executed by at least one processor, to enforce following steps:

creating N user groups for N operators, where N is a positive integer greater than 1;

dividing resources of the shared radio unit into public resources and N private resources;

binding the N user groups and the N private resources correspondingly, and setting the N user groups to only have access to corresponding private resources bound in the N private resources;

initializing resource permissions of the shared radio unit, and sending account passwords configured for the N user groups to the corresponding N operators respectively; and the N operators configuring parameters to a data model language database according to the account passwords;

wherein the data model language database is a YANG database, and the initializing resource permissions of the shared radio unit comprises:

creating the N user groups in ietf-netconf-acm;

creating permissions of o-ran-uplane-conf in the ietf-netconf-acm, the permissions comprise reading, writing and executing;

binding relationship between the N user groups and the resource permissions in the ietf-netconf-acm;

defining a name of each resource of the o-ran-uplane-conf;

creating a resources.json file to save the relationship between the N user groups and the resource permissions of each resource;

creating N users, and adding the N users to the N different user groups respectively; and handing over the account passwords configured for the N user groups to the N operators.

6. The non-transitory computer-readable storage medium according to claim 5, wherein the N operators configuring parameters to a data model language database according to the account passwords comprises:

the N operators using the account passwords to establish a NETCONF connection with a radio unit device;

the N operators invoking an edit-config command of NETCONF to modify parameters of frequency point and bandwidth;

the radio unit device receiving a remote procedure call request of NETCONF to trigger detection of application configuration management permission, and determining whether the operators have permission to edit parameters of the o-ran-uplane-conf, when the operators have the permission to edit the parameters of the o-ran-uplane-conf, triggering resource permission detection, and determining whether the operators have the permission to edit the parameters corresponding to a carrier name; and if the operators have the permission to edit the parameters corresponding to a carrier name, configuring parameters to the YANG database.

* * * * *